United States Patent
Kuck et al.

(10) Patent No.: US 6,652,975 B2
(45) Date of Patent: Nov. 25, 2003

(54) ADHERENT SILICONES

(75) Inventors: Valerie Jeanne Kuck, Upper Montclair, NJ (US); Richard T Olsson, Lidingo (SE)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/798,812

(22) Filed: Mar. 2, 2001

(65) Prior Publication Data

US 2002/0122946 A1 Sep. 5, 2002

(51) Int. Cl.⁷ .................................................. B32B 9/04
(52) U.S. Cl. ....................... 428/447; 524/261; 524/265; 385/50; 385/129
(58) Field of Search ................................ 524/261, 265; 428/447; 385/50, 129

(56) References Cited

U.S. PATENT DOCUMENTS

| 5,229,433 A | 7/1993 | Schunck et al. ............... 522/96 |
| 5,352,712 A | 10/1994 | Shustack ........................ 522/31 |
| 5,461,691 A | 10/1995 | Schunck et al. ............. 385/123 |
| 5,536,529 A | 7/1996 | Shustack .................. 427/163.2 |
| 5,612,399 A * | 3/1997 | Beckley et al. .............. 524/261 |
| 5,620,495 A | 4/1997 | Aspell et al. .................. 65/392 |
| 5,639,846 A | 6/1997 | Shustack ....................... 528/44 |
| 5,773,486 A | 6/1998 | Chandross et al. ............ 522/33 |
| 5,989,627 A | 11/1999 | Blyler, Jr. et al. ....... 427/163.2 |
| 5,998,497 A | 12/1999 | Ishikawa et al. .............. 522/96 |
| 6,002,823 A * | 12/1999 | Chandross et al. ............ 385/50 |
| 6,310,146 B1 * | 10/2001 | Katsoulis et al. ............ 525/477 |
| 2002/0001320 A1 * | 1/2002 | Itoh ................................ 372/6 |

OTHER PUBLICATIONS

Tsumura et al., Silicon–Based Interpenetrating Polymer Networks (IPN's): Synthesis and Properties, Apr. 17, 1998, Macromolecules, American Chemical Society, 31 (9), 2716–2723.*

* cited by examiner

Primary Examiner—Robert Dawson
Assistant Examiner—Christopher M. Keehan
(74) Attorney, Agent, or Firm—John F. McCabe (57) ABSTRACT

A process for forming a composition includes providing a liquid mixture that includes silicone oligomers and silsesquioxane oligomers and curing the liquid mixture to form a composition of first and second polymers. The first polymer includes the silsesquioxane oligomers cross-linked by siloxane bonds. The second polymer includes a cross-linked network formed in part of the silicone oligomers.

35 Claims, 6 Drawing Sheets

ADHERENT SILICONES

BACKGROUND OF THE INVENTION

1. Field of the Invention

This invention relates to silicone-based polymer coatings.

2. Discussion of the Related Art

Polymers form interconnected networks of molecularly cross-linked oligomers. Polymer networks having dialkyl siloxane backbones are generally known as silicones. Silicones are widely used as coatings and sealants for glass, ceramic, and metal surfaces. Many silicone coatings are transparent to visible and near ultraviolet (UV) light. The transparency of silicones makes these coatings useful for protecting optical surfaces that transmit light.

Conventional silicones are weak and easily tear in response to mechanical stresses, because the coatings have low cross-link densities. The resistance of some conventional silicone coatings to tearing has been increased by adding metal oxide or silica particles to the coatings. Unfortunately, the presence of such particles in the coatings also decreases their transparency and thus, makes these coatings less useful for protecting optical surfaces. The added oxide or silica particles also damage some surfaces that the coatings are used to cover. For example, these particles can scratch optical fibers and the scratches lead to an increase in fiber breakage.

Vinyl addition silicones lack functional groups that readily adhere to silica-glass or metal surfaces and lack an intrinsic polarizablility that could otherwise promote adherence. These properties limit the ability of those silicones to adhere to surfaces with bound hydroxyl groups, because the coatings do not molecularly or electro-statically bind to the surfaces. The inability of those silicones to strongly adhere to underlying surfaces reduces the durability of silicone coatings and enables water to undercut the coatings and thereby promote coating detachment.

SUMMARY OF THE INVENTION

In one aspect, the invention features a process for forming a composition. The process includes providing a liquid mixture that includes silicone oligomers and alkyl silsesquioxane oligomers and curing the liquid mixture to form a composition of first and second polymers. The first polymer includes a cross-linked silicone network formed in part of the silicone oligomers. The second polymer includes the alkyl silsesquioxane oligomers cross-linked by siloxane bonds.

In another aspect, the invention features a composition including first and second polymers. The first polymer includes a first network of cross-linked silicone oligomers. The second polymer includes a second network of alkyl silsesquioxane oligomers crosslinked by siloxane bonds.

In another aspect, the invention features an optical router having at least three optical ports. One of the ports optically couples to an optical conduit that includes a diffraction grating and a protective coating. The coating is formed of a composition of first and second polymers that includes silicones and siloxane cross-linked alkyl silsesquioxane oligomers, respectively.

In another aspect, the invention features a process for coating an article with a silicone. The process includes providing a liquid mixture including silicone oligomers and silsesquioxane oligomers, coating a surface of the article with the liquid mixture, and curing the coating on the surface to form a composition of first and second polymers. The first polymer includes the silicone oligomers, which are cross-linked to form another network. The second polymer includes the alkyl silsesquioxane oligomers cross-linked by siloxane bonds to form a network.

DETAILED DESCRIPTION OF THE INVENTION

Figure 1:
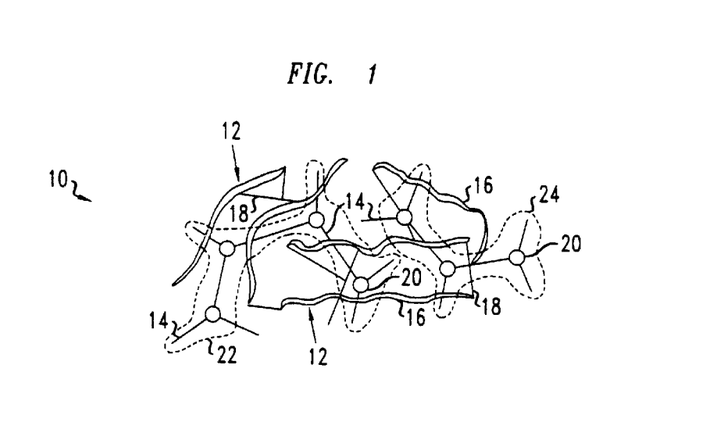
FIG. 1 shows a composition made of silicone-based and silsesquioxane-based polymers.

FIG. 1 shows one embodiment of a polymeric composition 10 that is useable as a coating or sealant. The composition 10 is formed from two interpenetrating and amorphous polymers 12, 14. In the first polymer 12, dialkyl siloxane oligomers 16 and cross-linker molecules 18 bind together through the addition of silicon hydrides of the cross-linker molecules 18 to vinyl-substitutions on the siloxane oligomers 16. In the second polymer 14, alkyl silsesquioxane oligomers 20 are bound together through siloxane bonds. The silicone oligomers 16, cross-linker molecules 18, and alkyl silsesquioxane oligomers 20 of the composition 10 have a variety of structures.

Instead of molecular bonding, physical interpenetration holds polymer 12 and polymer 14 together and makes composition 10 physically integral. In exemplary embodiments, one or both of the polymers 12, 14 include several separate networks 22, 24. Again, interpenetration keeps the separate networks 22, 24 bound to the rest of the composition 10 so that the entire composition 10 is physically integral.

Conventional methods that form silicones by vinyl addition of silicon hydrides to vinyl-substituted dialkyl siloxane chains produce cross-linked polymers with low crosslink densities. In contrast to such silicones, polymer 14 is cross-linked in three directions by siloxane bonds that make the polymer 14 stiffer and more tear-resistant. The interpenetration of 3-dimensional structure of the polymers 14 and 12 imparts the strength of the siloxane-bonded polymer 14 to the entire composition 10. This makes the composition 10 stiffer and more tear resistant than many conventional silicones.

Terminal alkoxyl and hydroxyl groups bonds also enable silsesquioxane polymer 14 to molecularly adhere to surfaces having hydroxyl groups. Surfaces with bond hydroxyl groups include surfaces made of silica-glass and many metals (e.g., iron). Binding polymer 14 to a surface makes the entire composition 10 adhere to the surface and resistant to undercutting by water because of the interpenetrating nature of polymers 12 and 14.

Figure 2A:
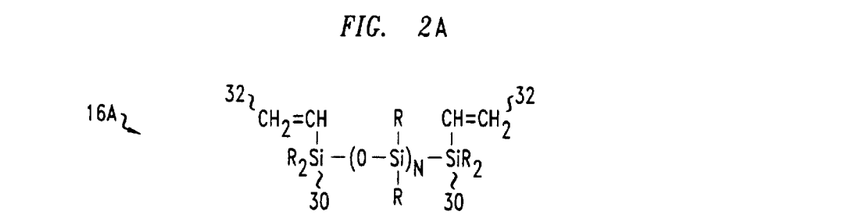
FIGS. 2A–2C shows exemplary silicone oligomers for making the silicone-based composition of FIG. 1.
Figure 2B:
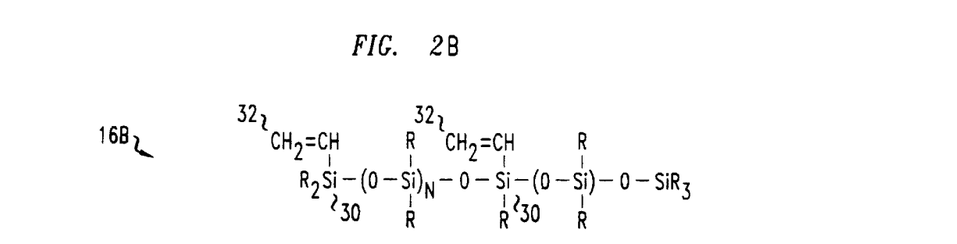
Figure 2C:
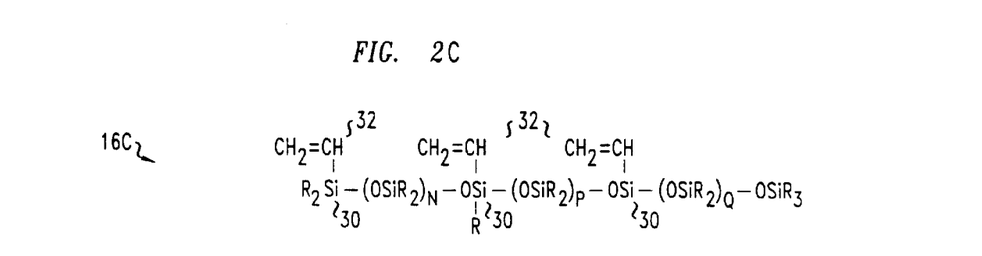

FIGS. 2A–2C show several embodiments 16A, 16B, 16C of the silicone oligomers 16 of FIG. 1. The silicone oligomers 16A, 16B, 16C have backbones composed of silicon and oxygen atoms connected by siloxane bonds. In the backbone, at least two silicon atoms 30 have vinyl functional groups 32 attached thereto. The silicon atoms 30 connecting to vinyl groups are at any location on the backbone. It is contemplated that at least some silicon atoms in the backbone are substituted with non-reactive R groups. The R groups may be small alkyl groups with 1–4 carbons. The various substitutions are either the same or different R groups.

Referring again to FIG. 1, polymer 12 is made from a mixture of silicone oligomers, e.g., a mixture of oligomers 16', 16", 16"' of FIGS. 2A–2C. Such mixtures are less expensive to produce than pure preparations of one type of silicone oligomer. Exemplary mixtures include silicone oligomers with a variety of structures and different weights between about 10,000 and 500,000 atomic mass units (AMUs).

Figure 3:
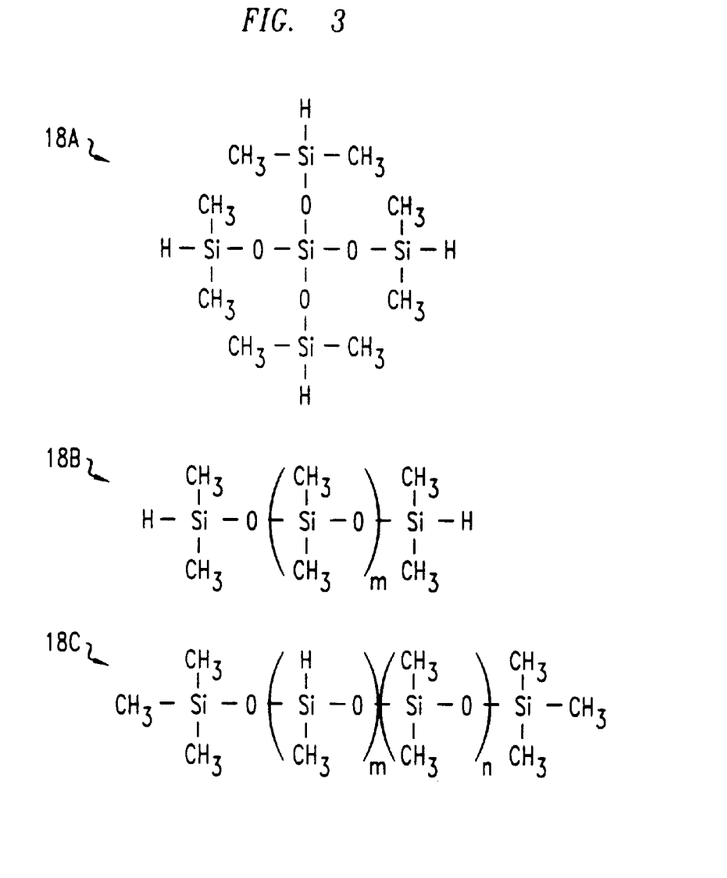
FIG. 3 shows an exemplary silicone cross-linker molecule for making the silicone-based composition of FIG. 1.

FIG. 3 shows exemplary structures 18A for cross-linker molecules, i.e., tetrakis(dimethyl siloxy)silane, useable to make polymer 12 of FIG. 1. Tetrakis(dimethyl siloxy)silane has a silicon and oxygen backbone substituted with four pendant SiH groups.

Other exemplary cross-linker molecules for making polymer 12 have linear or branched silicone and oxygen backbones 18B, 18C. Typically, the backbones have less than about 10–100 silicon atoms and are substituted with two or more —$SiR_2H$ functional groups. The backbones may also be substituted with non-reactive R-groups.

Exemplary polymers 12 are formed either with pure preparations of one cross-linker molecule, e.g., tetrakis (dimethyl siloxy)silane, or with mixtures of several cross-linker molecules.

Figure 4:
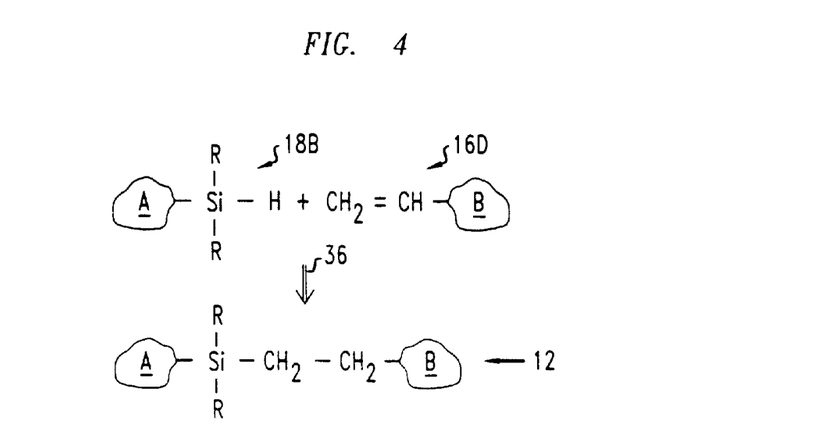
FIG. 4 illustrates a reaction that binds the silicone oligomers and cross-linker molecules to make the silicone-based composition of FIG. 1.

FIG. 4 illustrates a hydrosilylation reaction 36 that produces the condensed ethylene linkages 34 of polymer 12, shown in FIG. 1. Hydrosilylation entails reacting the vinyl functional group of silicone oligomer 16D with a —$SiR_2H$ functional group of cross-linker molecule 18B. Exemplary embodiments perform hydrosilylation with catalysts such as platinum or hexachloroplatinic acid and at temperatures in the range of about 65° C. to about 150° C. Usual temperatures are in the range of about 120° C. to 140° C.

Referring again to FIG. 1, polymer 12 is an interconnected network and not simply a linear chain of linked silicone oligomers. The interconnected nature of the network results, because cross-linker molecules, silicone oligomers, or both are substituted with three or more functional groups. For example, tetrakis(dimethyl siloxy)silane has four reactive $SiR_2H$ groups and thus, forms interconnected networks when reacted with silicone oligomers 16A or 16B of FIGS. 2A–2B, which only have 2 vinyl functional groups. Similarly, silicone oligomer 16C of FIG. 2C has three vinyl functional groups and forms interconnected networks when reacted when cross-linkers that only have two $SiR_2H$ functional groups.

Figure 5A:
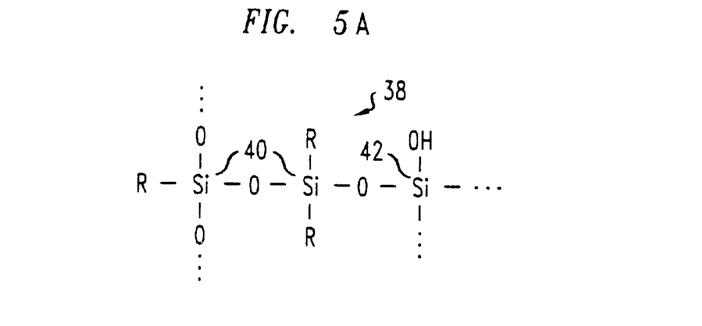
FIG. 5A shows a portion of an alkyl silsesquioxane oligomer for making the alkyl silsesquioxane oligomer-based composition of FIG. 1.

FIG. 5A shows a portion of a silsesquioxane oligomer 38 used in making polymer 14 of FIG. 1. The silsesquioxane oligomer 38 is made from the hydrolysis of alkyl alkoxyl silanes and has a branched backbone of siloxane-bonded silicon and oxygen atoms and a weight of less than about 1,500 AMUs. Some backbone silicons 40 are substituted with non-reactive R groups. Exemplary R groups include small alkyl groups with less than about 4–10 carbon atoms. Two or more backbone silicons 42 belong to reactive functional groups, e.g. —Si—OH, —Si—O— alkyl, —Si—O-methanol, and Si—O-ethanol, and may be further substituted with non-reactive R groups.

To decrease the cross-link density, dialkyl dialkoxyl silanes are cohydrolyzed with alkyl trialkoxyl silanes to produce a backbone having dialkyl siloxane groups. Exemplary R groups include small alkyl groups with less than about 4–10 carbon atoms.

Figure 5B:
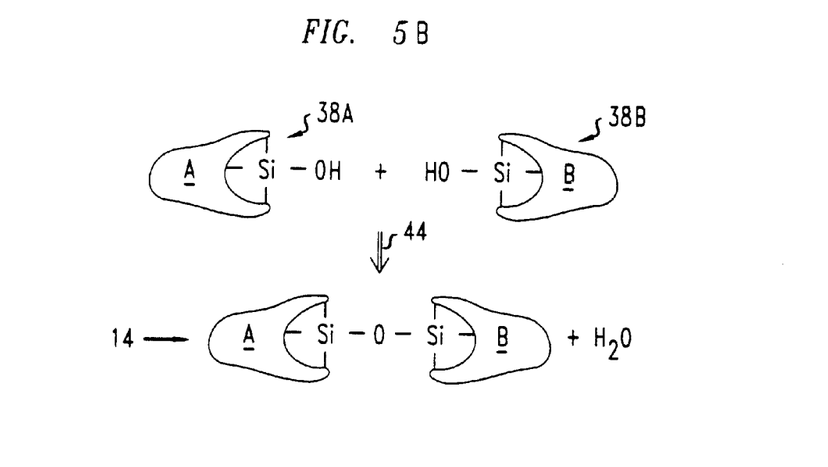
FIGS. 5B–5C illustrate reactions for cross-linking the alkyl silsesquioxane oligomers of FIG. 5A.
Figure 5C:
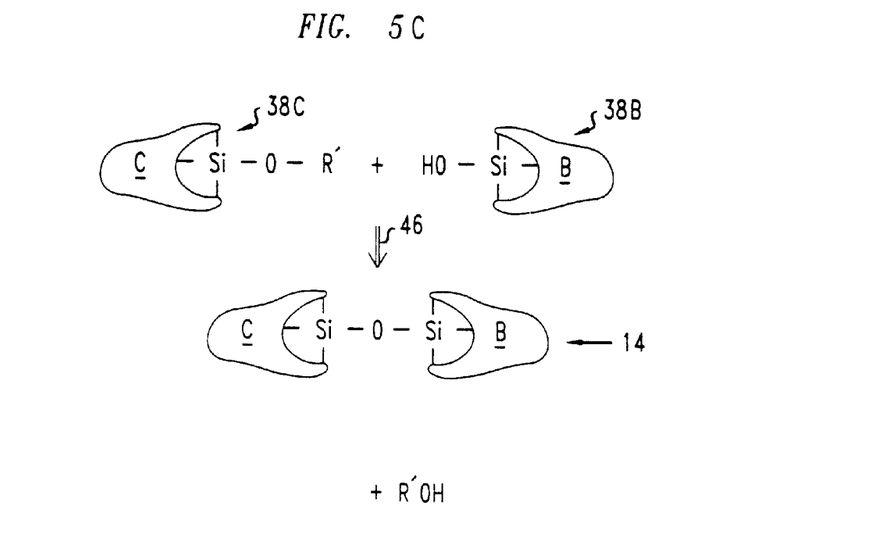

FIGS. 5B and 5C illustrate exemplary reactions 44, 46 for producing polymer 14 of FIG. 1 through formation of siloxane bonds between silsesquioxane oligomers 38A, 38B, 38C. The reactions 44, 46 proceed in the presence of Lewis acids or bases for temperatures in the range of about 25° C. to about 140° C. Exemplary Lewis acids include zinc octoate, tin octoate, stannous octoate, and ferrous octoate. Exemplary bases include various amines and a 1:3 mixture of ammonium tetrahydroxide and formic acid.

In exemplary embodiments, a mixture of silsesquioxane oligomers 38 of FIG. 5A is reacted to produce polymer 14 of FIG. 1. The mixture includes oligomers 38 having a range of molecular weights and a variety of backbone structures. Such mixtures produce the interconnected network of polymer 14 as long as a portion of the silsesquioxane oligomers 38 have three or more functional groups capable of reacting to form cross-linkages.

Referring again to FIG. 1, exemplary uses of composition 10 include forming adherent protective coatings. Exemplary coatings protect silica-glass surfaces of optical components. e.g., fibers, lens, or gratings. Other coatings form hard polymer housings that encapsulate and protect integrated circuits (IC's). Other coatings are adherent sealants for surfaces with bound —OH groups, e.g., many metal surfaces and surfaces sealable with conventional caulking compounds.

Figure 6:
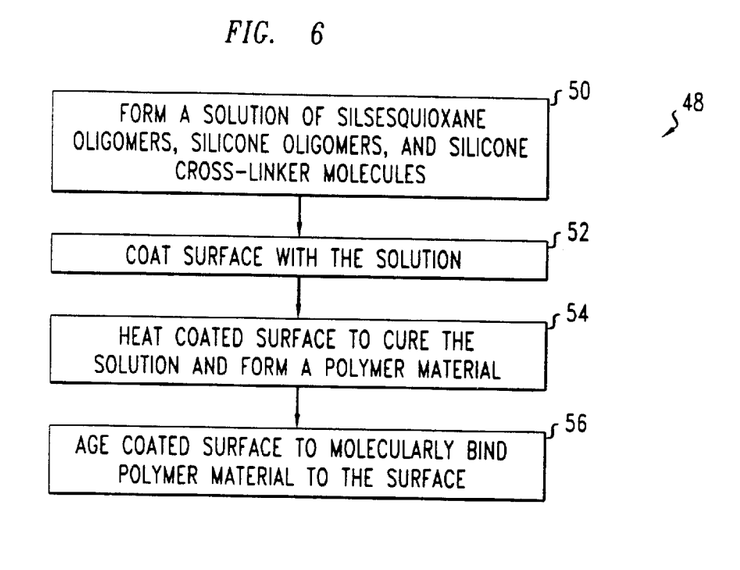
FIG. 6 is a flow chart for a process that forms a polymer coating with the composition of FIG. 1.

FIG. 6 is a flow chart for a process 48 that forms a coating of the polymeric composition 10 of FIG. 1. In preparation to making the composition 10, a solution of reactive silsesquioxane oligomers, silicone oligomers, and silicone cross-linker molecules is formed (step 52). The solution is a homogeneous liquid in which weight ratios of silsesquioxane oligomers to silicone oligomers are selected to produce a desired tear-resistance in the final composition 10. Typical weight ratios of silsesquioxane oligomers to silicone oligomers in the solution are in the range of about 1:99 and 1:3, e.g., a ratio of about 6:94. Weight ratios of silicone oligomers to silicone cross-linkers are about 10:1. If one component is a solid, the three components are dissolved in enough solvent to form a solution. The solution is used to conformally coat the surface of an object to be protected, e.g., a silica-glass fiber, metal surface, or an IC (step 54).

After coating, the object is heated to cure the solution into polymeric composition 10 (step 56). Heating makes the silicone oligomer and cross-linker molecules chemically react to form polymer 12 and makes the silsesquioxane oligomers chemically react to form polymer 14. If the three reactive components are homogeneously mixed in the solution, the polymer 12 and the polymer 14 interpenetrate to form material 10 after the curing. Some exemplary processes 48 fix temperatures so that reactions that cross-link silsesquioxane oligomers, complete earlier than the reaction that links the silicone oligomers. Completing reactions linking silsesquioxane oligomers first enables released water and alcohols to escape from the coating without forming bubbles, which could otherwise lower the transparency of the final coating to visible and ultraviolet light or cause crack formation in the coating upon cooling.

After curing, the coating is aged to produce molecular adhesion between the polymer coating and underlying surface (step 56). Adhesion to glass or metal surfaces results from the formation of siloxane bonds between polymer 14 and dangling —OH groups bond to the surface. Such dangling —OH groups are formed due to surface hydration, e.g., hydration caused by water released during the formation of polymer 14.

In exemplary embodiments, solvents also evaporate from polymers 12, 14 during the aging. As a result, polymer 12 and polymer 14 are typically dry in composition 10 after aging.

One process uses a commercial mixture of silsesquioxane oligomers in process 48 of FIG. 6. The mixture is sold in a solid form, i.e., flakes, under product name 650F by Techniglass Company of Perrysburg, Ohio. The process includes grinding the flakes to a powder to facilitate dissolution and then, mixing the powder with enough solvent, e.g., ethyl acetate, 2-heptanone, or chloroform, to form a homogeneous liquid. The process includes adding the liquid containing the silsesquioxane oligomers to liquid silicone oligomers to form another homogeneous liquid. The later process is speeded up by heating the liquid to about 100° C. to 110° C. After a homogeneous liquid is obtained, the liquid is cooled to room temperature. The process includes mixing the cooled liquid with silicone cross-linker molecules to form another homogeneous liquid.

The final liquid has about a 1:99 to 1:3 weight ratio of silsesquioxane oligomers to silicone oligomers. In this range, higher weight ratios, e.g., about 1:6 to 1:3, produce more tear-resistant and more strongly adherent coatings because of the higher percentage of silsesquioxane oligomers in the final coating. Exemplary suspensions have a weight ratio of silsesquioxane oligomers to silicone oligomers of about 6:94 and a weight ratio of silicone oligomers to cross-linker molecules of about 10:1.

The process includes centrifuging the final liquid at low speed to separate out the insoluble, high molecular weight, silsesquioxane polymers. Separation is achieved when the resulting liquid has a more transparent phase and less transparent phase. The more transparent phase is extracted and the less transparent phase, which has higher molecular weight polymers, is discarded. The process includes coating the surface to be protected with the liquid from the extracted phase. Then, the coated surface is cured at a temperature in the range of about 110° C. to about 140° C. and then, the coated surface is aged for about 1 day to 1 week to cause the coating to molecularly adhere to the underlying surface.

An alternate process for forming a coating according to process 50 of FIG. 6 uses silsesquioxane oligomers that are a liquid precursor of the solid-form silsesquioxane oligomers. The liquid precursor has silsesquioxane oligomers of lower molecular weight than those in the flakes and is sold as a 25:75 weight/weight percent solution in ethanol under the product name GR655L by Techniglass Company of Perrysburg, Ohio. Prior filtering of the GR655L removes particles with diameters greater than about 1 micron from the liquid precursor.

The alternate process includes forming a liquid solution of the above-described liquid silsesquioxane precursor solution and a liquid mixture of silicone oligomers and cross-linker molecules. The liquid mixture of silicone oligomer and cross-linker molecules has about a 10:1 weight ratio of silicone oligomers to silicone cross-linker molecules and is commercially available under product name Sylgard 182 from the Dow-Corning Company. The resulting solution has a weight ratio of silsesquioxane oligomer to silicone oligomer in the range of about 1:99 to 1:3. The solution is used to coat the surface to be protected, e.g., a silica-glass or metal surface. Then, the coated surface is heat cured and aged as described above.

Figure 7A:
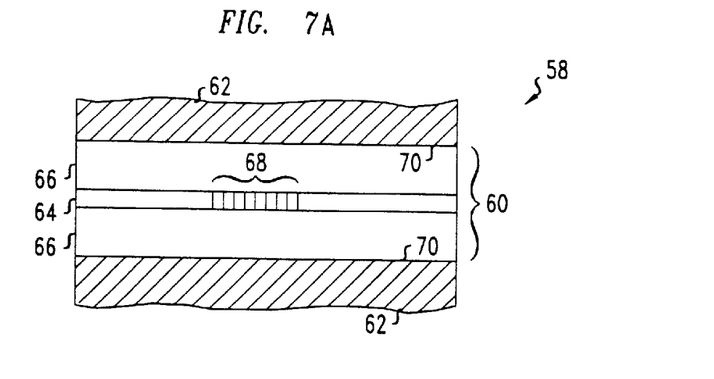
FIG. 7A shows a conduit grating with an adherent and UV transparent silicone-based coating.

FIG. 7A shows an embodiment of a conduit grating 58. The conduit grating 58 includes an optical conduit 60 with a protective conformal silicone-based coating 62 formed from polymeric composition 10 of FIG. 1. Exemplary optical conduits include optical fibers and planar waveguides. The optical conduit 60 has silica-glass core 64 and silica-glass cladding 66 with a lower refractive index than the core 64. The core 64 includes a diffraction grating 68. The coating 62 molecularly binds to outer surface 70 of the cladding layer 66 and is transparent to visible light and to ultraviolet (UV) light with wavelengths in the range of about 240–260 nanometers (nm).

Figure 7B:
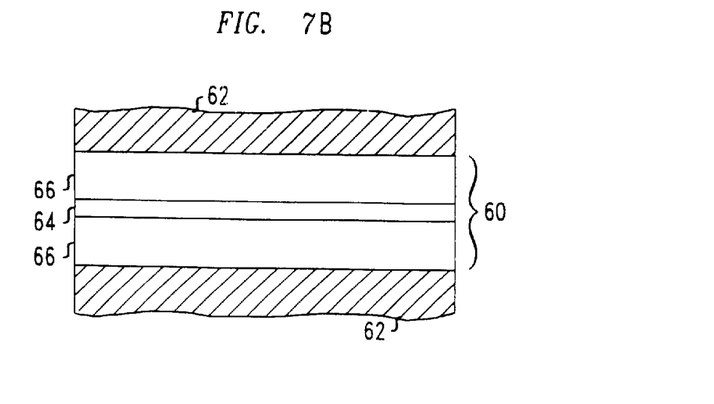
FIG. 7B shows an optical conduit of FIG. 7A prior to writing the grating therein.

FIG. 7B shows optical conduit 60 of FIG. 7A prior to fabrication of grating 68 therein. The transparency of the conduit's protective polymer coating 62 permits using UV light to optically write the grating 68 into core 64 without stripping the coating 62 off the conduit 60.

Figure 7C:
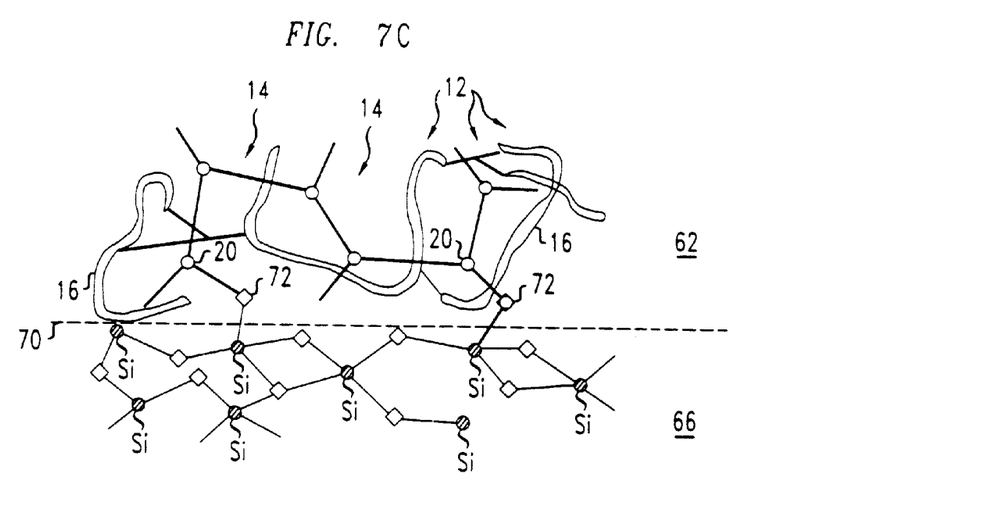
FIG. 7C is an enlarged cross-sectional view of the interface between the optical conduit and coating of FIGS. 7A and 7B.

FIG. 7C is an enlarged view through surface 70 that separates cladding layer 66 and silicone-based coating 62 of optical conduit 60 shown in FIGS. 7A and 7B. The coating 62 includes interpenetrating polymers 12 and 14 made of cross-linked silicones and cross-linked silsesquioxane oligomers, respectively. Some silsesquioxane oligomers 20 of the polymer 14 molecularly bind to silicon atoms (Si) of the cladding layer 66 via siloxane bonds 72 thereby making the coating 62 adhere to the optical conduit 60.

Figure 8:
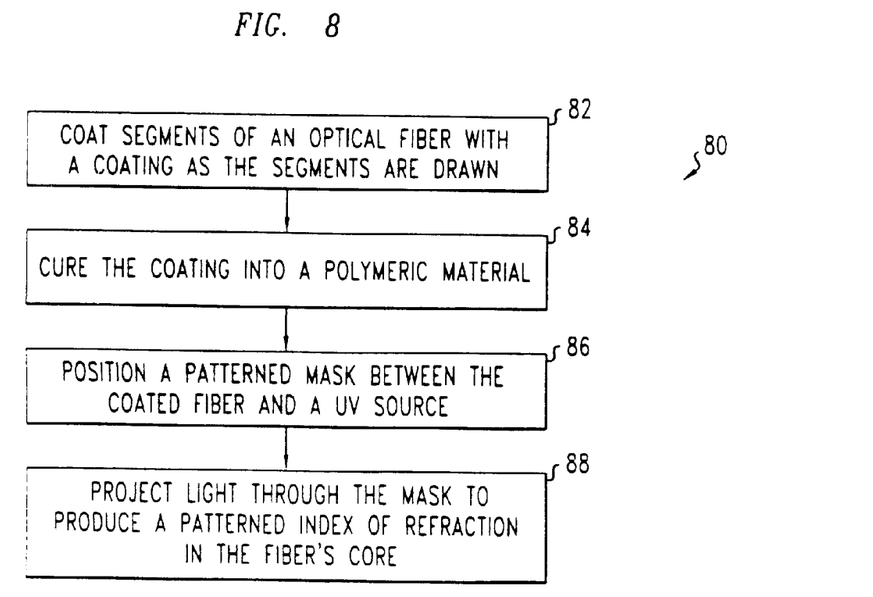
FIG. 8 is a flow chart for a method of fabricating a fiber embodiment of the conduit grating of FIGS. 7A–7C.

FIG. 8 is a flow chart for a method 80 of fabricating a fiber embodiment of the conduit grating 58 of FIG. 7A. The method 80 includes coating segments of an optical fiber with a coating as the segments leave the draw tower (step 82). The coating is a homogeneous liquid mixture that includes silsesquioxane oligomers, silicone oligomers, and silicone cross-linker molecules. The method 80 includes thermally curing the coated fiber to change the coating into polymeric composition 10 of FIG. 1 (step 84). Curing uses heat and not UV light, because the coating is transparent to and thus, non-absorbent of UV light, e.g., at wavelengths between about 240 nm and about 260 nm. The coating cures rapidly so that the coating is cured between the time that the fiber is drawn and wound on a storage spool. Exemplary embodiments also age the coated fiber to form siloxane bonds that molecularly bind the coating 62 to the silica-glass of the underlying optical conduit 60 thereby making the coating strongly adherent and resistant to undercutting by water.

After curing coating 62, a patterned optical mask is positioned between a UV light source and a segment of the coated fiber (step 86). Then, UV light with wavelength between about 240 nm and about 260 nm is projected onto the mask, which patterns the light, so that patterned light passes through coating 62 and into core 64 of optical conduit 58 (step 88). Absorption of the UV light by dopant atoms in the core 64 causes the production of defects in the silica-glass thereby causing a modulation of the core's refractive index that produces grating 68.

In the prior art, optically writing a grating into an optical fiber involved stripping a protective polymer coating off the fiber, because commercial polymer coatings are opaque to UV light. In addition, silicone coatings with metal oxide/silica particle additives are also opaque to UV light and must be stripped. Stripping polymer coatings often damaged the underlying fiber. By eliminating the need to strip coatings, the method 80 produces fewer damaged fibers than convention methods to make fiber gratings.

Figure 9:
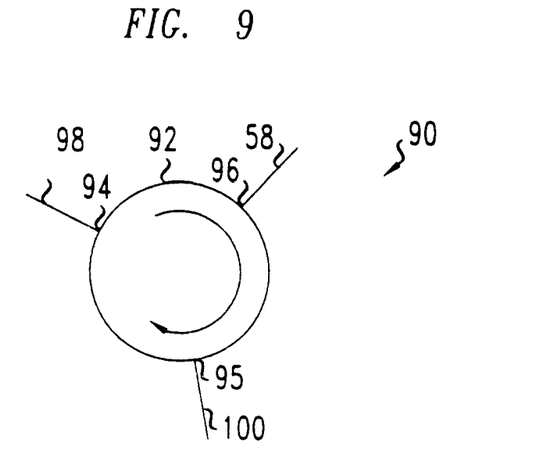
FIG. 9 shows an optical router that uses the fiber embodiment of the conduit grating of FIGS. 7A–7C.

FIG. 9 shows an optical router 90 based on a fiber embodiment of conduit grating 58 of FIG. 7A. The router 90 includes an optical circulator 92 with at least three optical ports 94–96. The ports 94–96 connect to fiber 98, fiber 100 and conduit grating 58, respectively. The conduit grating 58 receives light that previously entered the circulator 92 via the fiber 98 and reflects received light belonging to a preselected wavelength range back to the optical circulator 92. The conduit grating 58 transmits light in other wavelength ranges without back reflection. The circulator 92 in turn redirects the light reflected back by the conduit grating 58 to the fiber 100. Thus, the router 90 performs wavelength selective routing.

Figure 10:
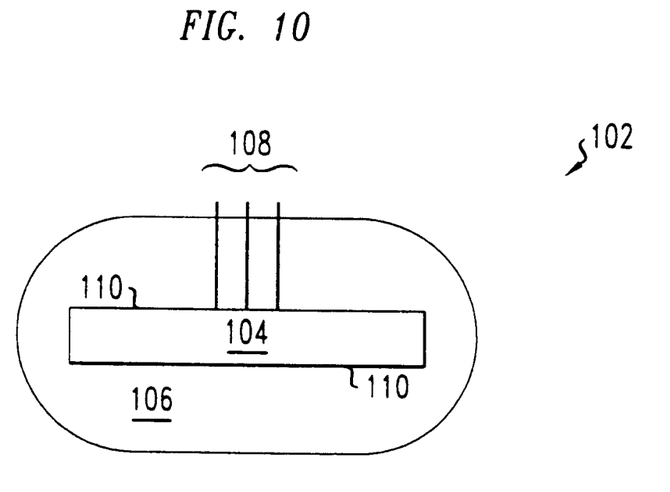
FIG. 10 shows an encapsulated integrated circuit.

FIG. 10 shows an encapsulated integrated circuit (IC) 102. The IC 102 includes active semiconductor chip 104, housing 106, and electrical leads 108. The housing 106 is made from polymeric composition 10 of FIG. 1. In exemplary embodiments, material of the housing 106 binds by siloxane bonds to silica-glass passification layers 110 of the semiconductor chip 104.

Other embodiments use composition 11 of FIG. 1 to form conformal adherent coatings on surfaces with bond —OH groups, e.g., silica-glass or metal surfaces. On such surfaces, the composition 10 produces an adherent coating after aging. The aged coating is transparent to visible and near UV light and resistant to both mechanical stripping and to undercutting by ambient water.

Other embodiments of the invention will be apparent to those skilled in the art in light of the specification, drawings, and claims of this application.

What is claimed is:

1. A process, comprising:
   providing a liquid mixture comprising silicone oligomers and silsesquioxane oligomers; and
   curing the liquid mixture to form a composition of first and second polymers, the first polymer forming a first interconnected network comprising portions of the silsesquioxane oligomers cross-linked by siloxane bonds, the second polymer forming a second interconnected network formed in part from portions of the silicone oligomers; and
   wherein the first and second interconnected networks physically interpenetrate.

2. The process of claim 1, wherein the second network is formed by silane hydride addition to vinyl silane groups on the silicone oligomers.

3. The process of claim 2, further comprising coating a surface with the liquid mixture prior to the curing.

4. The process of claim 3, further comprising:
   forming siloxane bonds between the surface and the first polymer.

5. The process of claim 3, wherein the surface is an outer surface of an optical conduit; and further comprising transmitting light through the coated surface.

6. The process of claim 5, wherein the light is ultraviolet light and the transmitting causes a grating to form in the optical conduit.

7. The process of claim 1, wherein the liquid mixture has a weight ratio of silsesquioxane oligomer to silicone oligomer of between about 1:99 and 1:3.

8. The process of claim 1, wherein the providing a liquid mixture includes mixing silicone cross-linker molecules with the silicone oligomers.

9. The process of claim 8, wherein the silicone oligomers have at least two vinyl groups and the cross-linker molecules have groups that react with vinyl groups.

10. The process of claim 9, wherein part of the cross-linker molecules have at least three groups that can react with vinyl groups.

11. The process of claim 8, wherein a portion of the silsesquioxane oligomers have functional groups selected from a group consisting of SiOH and Si—O-ethyl.

12. The process of claim 8, wherein the curing includes heating the liquid mixture.

13. The process of claim 1, wherein the silsesquioxane oligomers include poly-silsesquioxanes having molecular weights of less than about 1,500 AMU's.

14. The process of claim 1, wherein the silicone oligomers have molecular weights of less than about 500,000 AMU's.

15. The process of claim 3, wherein the coating includes covering a surface of an integrated circuit with the liquid mixture.

16. The process of claim 3, wherein the coating includes covering a surface with bonded OH groups with the liquid mixture.

17. A manufacture, comprising:
   a composition including a first silicone polymer and a second silsesquioxane polymer, the first polymer comprising a first interconnected network, the second polymer comprising a second interconnected network; and
   wherein the first and second interconnected networks physically interpenetrate.

18. The manufacture of claim 17, further comprising:
   an object with a surface; and
   wherein the composition coats the surface.

19. The manufacture of claim 18, wherein the object is an optical conduit, the surface being an outer surface of the conduit.

20. The manufacture of claim 19, wherein the optical conduit includes a grating and the composition is transparent to a selected wavelength range of ultraviolet light.

21. The manufacture of claim 19, wherein the optical conduit is a silica-glass optical fiber.

22. The manufacture of claim 17, wherein the second network includes polysilsesquioxane.

23. The manufacture of claim 18, wherein the second network binds to the surface by siloxane bonds.

24. The manufacture of claim 23, wherein the surface comprises one of silica glass and a metal.

25. The manufacture of claim 18, wherein the object includes a semiconductor integrated circuit and the composition forms an encapsulating housing around the integrated circuit.

26. An optical router comprising:
   an optical device with at least three optical ports;
   an optical conduit optically coupled to one of the ports, the conduit including a diffraction grating and a protective coating formed of a composition of a first silicone polymer and a second silsesquioxane polymer, the first polymer including a first interconnected network, the second polymer including a second interconnected network cross-linked by siloxane bonds; and wherein the first and second interconnected networks physically interpenetrate.

27. The router of claim 26, wherein the optical device includes an optical circulator.

28. The router of claim 26, wherein the coating is transparent to a range of ultraviolet wavelengths.

29. The router of claim 26, wherein the conduit is a silica-glass optical fiber.

30. A process for coating an article with a silicone, comprising:

providing a liquid mixture comprising silicone oligomers and silsesquioxane oligomers;

coating a surface of the article with the liquid mixture; and curing the coating on the surface to form first and second polymers, the first polymer forming a first interconnected network comprising portions of the silsesquioxane oligomers cross-linked by siloxane bonds and the second polymer comprising a second interconnected network formed in part of portions of the silicone oligomers; and wherein the first and second interconnected networks physically interpenetrate.

31. The process of claim 30, wherein the second interconnected network is cross-linked by Si—CH$_2$—CH$_2$—Si linkages.

32. The process of claim 31, further comprising:

aging the coating to form siloxane bonds between the surface and the first polymer.

33. The process of claim 31, wherein the surface is an outer surface of an optical conduit; and further comprising transmitting UV light through the coating to form a grating in the conduit.

34. The process of claim 30, wherein the providing a liquid mixture includes mixing silicone cross-linker molecules with the silicone oligomers, the silicone oligomers having at least two vinyl groups and the cross-linker molecules having groups that react with vinyl groups.

35. The process of claim 30, wherein the silsesquioxane oligomers include poly-silsesquioxanes having molecular weights of less than about 1,500 AMU's.

* * * * *